3,247,130
ENERGY ABSORBING COMPOSITION
William T. Isbell, Herculaneum, Mo., assignor to St. Joseph Lead Company, New York, N.Y., a corporation of New York
No Drawing. Filed July 16, 1962, Ser. No. 210,246
3 Claims. (Cl. 252—478)

This invention relates to novel compositions and structure useful for the absorption or dissipation of vibrational or radiated energy including sound waves, high energy electromagnetic radiations such as X-rays and gamma rays, and radiated particles.

A purpose of the invention is to provide stable non-toxic structures capable of absorbing noxious energy impinging thereon.

Another aspect of the invention is the provision of acoustic and radiant energy absorbing structures.

It has long been recognized that metallic lead is an effective absorber of vibrational energy and lead in various forms such as sheet lead, shredded lead and comminuted lead have been used for this purpose. However, lead does not have suitable structural properties in many uses and metallic lead as well as many of the compounds of lead are toxic, unstable, reactive or reaction-catalysing in many environments.

The present invention is based on the discovery that compositions containing a substantial proportion of particulate lead sulphide, particularly in the form of concentrates of the mineral galena, dispersed in a solidified matrix material can be effectively used to provide sound and radiant energy absorbing structures adapted for use in a wide variety of environments. The matrix material may comprise solidified thermoplastic compositions such as polyalkylenes, polystyrene, polyvinylchloride and other polymerized vinyl compounds; thermosetting plastics such as phenolic and amino plastics; condensation polymers such as polyester, polyamide, polymethane, polycarbonate and epoxy resins; synthetic and natural elastomeric compounds; asphaltic compositions; vitreous compositions and cementitious compositions.

The choice of matrix material will depend primarily on the environment in which the composition is to be used. For example, sound absorbing flooring compositions which are supported by underflooring may consist of asphaltic compositions such as are commonly used for flooring, containing upwards of 50% by volume of lead sulphide in the form of finely divided galena, while for uses in which plastic flow or creeping would be undesirable, as in sound absorbing curtain walls, matrix compositions of greater strength and rigidity, such as, for example, polyalkylene or polyvinyl thermoplastics are preferable.

In general, the lead sulphide content of the compositions of the invention will be between about 45 and about 95% by weight, provided preferably by from about 50% to about 90% by weight of 80% galena concentrate (about 92 to 93% PbS).

In general, it is desirable that the lead sulphide content be as high as is compatible with the strength and flexibility desired in the final compositions as the energy absorbing properties of the compositions increase in substantially direct proportion to the lead sulphide content. Compositions having a lead sulphide content of at least about 80% by weight will generally be preferable. In most uses the size and size distribution of the galena particles is not critical and in general, galena concentrates in which substantially all of the particles are below 200 mesh is very satisfactory.

In the energy absorbing compositions of the invention, the particulate lead sulphide is stable, non-toxic and chemically inert being compatible and unreactive with a wide range of solidifiable matrix compositions at the usual temperatures of production and use. The lead sulphide also has a stabilizing action in plastic compositions and protects plastic compositions, such as the polyalkylenes and the polyvinyls, from the deleterious effects of actinic light.

The compositions of the invention may be laminated upon or between sheets or webs of other material to improve the strength or the creep resistance or other properties of the combination. For example, one or more sheets of glass fiber or plastic-glass fiber composition may be interlaminated with one or more sheets of the energy absorbing compositions of the invention, or a layer of the compositions of the invention may be cast, spread or otherwise applied upon or between one or more sheets of metal such as aluminum or stainless steel or of plywood.

In making the compositions of the invention, the mixing, milling, molding, casting, extruding and laminating techniques commonly used in manipulating the matrix materials of the compositions may be utilized.

The following examples are illustrative of the compositions of the invention and of methods of preparing them:

*Example 1*

92.5% by weight of 80% galena concentrate (−200 mesh) was milled into polyvinylchloride plastic (plasticized with dioctylphthalate) at about 300° F. and extruded through a conventional extrusion machine into sheets 50 inches wide and ⅛-inch thick.

The sheets were attached to a glass fiber fabric backing with epoxy cement and were subjected to standard acoustic absorption tests. In the test, they gave a sound transmission class rating of 38. The same sheets laminated to ⅜-inch plywood gave a sound transmission class rating of 41.

*Example 2*

85% by weight of 80% galena concentrate (−200 mesh) was milled at about 200° F. into synthetic rubber composition comprising ethylene-propylene copolymer (31 mole percent propylene) and molded at about 250° F. into sheets ⅛-inch in thickness.

When tested against penetration by X-rays, the sheets showed a metallic lead equivalent of about .033 inch.

*Example 3*

90% by weight of 80% galena concentrate (−200 mesh) was milled at about 320° F. into a high density polypropylene plastic (Hy-fax of Hercules Powder Company) and molded at about 350° F. into sheets ⅛-inch in thickness. These sheets showed a tensile strength of about 3,000 p.s.i., a very substantial retention of the strength of the unloaded plastic in spite of the high loading.

In the foregoing examples, the galena concentrate may be replaced by equivalent amounts of synthetic lead sulphide, obtained, for example, by precipitation with hydrogen sulphide or alkali metal sulphides from aqueous solutions of water-soluble lead salts and separating and drying the precipitate.

The lead sulphide containing compositions of the invention may be applied to existing structures, such as ducts and walls, or to fabricated base members, by troweling, spraying or otherwise applying the compositions in a fluent or plastic condition and allowing them to harden in situ, for example, by solvent evaporation, oxidative condensation or catalytically actuated condensation. Reactive constituents of air hardening compositions may be intermixed in the spray gun in accordance with well-known procedures.

I claim:

1. An energy absorbing composition comprising from about 45% to about 95% by weight of particulate lead sulphide in the form of galena concentrate dispersed in a solidified matrix material consisting essentially of a polyalkylene plastic.

2. An energy absorbing composition comprising from about 45% to about 95% by weight of particulate lead sulphide in the form of galena concentrate dispersed in a solidified matrix material consisting essentially of a polyvinyl plastic.

3. An energy absorbing composition comprising from about 45% to about 95% by weight of particulate lead sulphide in the form of galena concentrate dispersed in a solidified matrix material consisting essentially of an asphaltic composition.

References Cited by the Examiner
UNITED STATES PATENTS

| 753,310 | 3/1904 | Price | 252—478 |
| 1,278,010 | 9/1918 | Poetschke | 252—478 |
| 2,580,360 | 12/1951 | Morrison. | |
| 2,858,451 | 10/1958 | Silversher | 252—478 |

REUBEN EPSTEIN, *Primary Examiner.*

CARL D. QUARFORTH, *Examiner.*